US012066796B2

(12) United States Patent
Li

(10) Patent No.: US 12,066,796 B2
(45) Date of Patent: Aug. 20, 2024

(54) SMART WATCH WITH FLEXIBLE DISPLAY PANEL

(71) Applicant: Zhejiang Geely Holding Group Co., LTD., Hangzhou (CN)

(72) Inventor: Shufu Li, Hangzhou (CN)

(73) Assignee: ZHEJIANG GEELY HOLDING GROUP CO., LTD., Hangzhou (CN)

( * ) Notice: Subject to any disclaimer, the term of this patent is extended or adjusted under 35 U.S.C. 154(b) by 915 days.

(21) Appl. No.: 17/043,651

(22) PCT Filed: Feb. 4, 2020

(86) PCT No.: PCT/CN2020/074300
§ 371 (c)(1),
(2) Date: Sep. 29, 2020

(87) PCT Pub. No.: WO2020/164415
PCT Pub. Date: Aug. 20, 2020

(65) Prior Publication Data

US 2021/0018879 A1 Jan. 21, 2021

(30) Foreign Application Priority Data

Feb. 12, 2019 (CN) ......................... 201910111783.3

(51) Int. Cl.
*G04G 17/04* (2006.01)
*A44C 5/00* (2006.01)
(Continued)

(52) U.S. Cl.
CPC ........... *G04G 9/007* (2013.01); *A44C 5/0053* (2013.01); *G04G 17/045* (2013.01); *G04G 19/10* (2013.01); *G04G 21/02* (2013.01); *G04G 21/04* (2013.01)

(58) Field of Classification Search
CPC ...... G04G 9/007; G04G 17/045; G04G 19/10; G04G 21/02; G04G 21/04; A44C 5/0053
See application file for complete search history.

(56) References Cited

U.S. PATENT DOCUMENTS 4,941,236 A * 7/1990 Sherman .............. A44C 5/2071 24/303
5,579,906 A * 12/1996 Fabbri .................... A45C 11/12 206/781

(Continued)

FOREIGN PATENT DOCUMENTS

CN 103458083 A 12/2013
CN 204229762 U 3/2015

(Continued)

*Primary Examiner* — Sean Kayes
(74) *Attorney, Agent, or Firm* — Cheng-Ju Chiang

(57) ABSTRACT

A smart watch includes a watch strap and a flexible display panel. The first end of the flexible display panel is attached to the watch strap, and the second end of the flexible display panel is a free end. The flexible display panel has a bent state and a flattened state. When the flexible display panel is in the bent state, the flexible display panel and the watch strap are bent together and the flexible display panel is located on and in contact with an outer surface of the watch strap. When the flexible display panel is in the flattened state, the second end of the flexible display panel is out of contact with the outer surface of the watch strap and the flexible display panel is flattened in the same plane.

19 Claims, 8 Drawing Sheets

(51) Int. Cl.

| | |
|---|---|
| ***G04G 9/00*** | (2006.01) |
| ***G04G 19/10*** | (2006.01) |
| ***G04G 21/02*** | (2010.01) |
| *G04G 21/04* | (2013.01) |

(56) References Cited

U.S. PATENT DOCUMENTS

| | | | | |
|---|---|---|---|---|
| 5,818,165 | A * | 10/1998 | Malhi | H01J 29/862 313/496 |
| 6,619,836 | B1 * | 9/2003 | Silvant | G04G 17/08 368/282 |
| 7,558,057 | B1 * | 7/2009 | Naksen | G06F 1/1613 361/679.56 |
| 10,905,019 | B2 * | 1/2021 | Kim | B21B 39/008 |
| 2006/0209218 | A1 * | 9/2006 | Lee | G04G 17/08 349/1 |
| 2008/0239881 | A1 * | 10/2008 | Kokuryu | G04G 13/026 368/73 |
| 2014/0099479 | A1 | 4/2014 | Krall et al. | |
| 2015/0022957 | A1 * | 1/2015 | Hiroki | G04G 17/08 361/679.01 |
| 2016/0061613 | A1 * | 3/2016 | Jung | G01C 21/3632 701/538 |
| 2016/0124395 | A1 | 5/2016 | Lee | |
| 2016/0183364 | A1 | 6/2016 | Choi et al. | |
| 2016/0327987 | A1 * | 11/2016 | Huitema | G04G 17/045 |
| 2016/0357158 | A1 | 12/2016 | Kim | |
| 2017/0199712 | A1 | 7/2017 | Lee | |
| 2018/0020193 | A1 * | 1/2018 | Blum | G03B 17/561 |
| 2018/0364557 | A1 | 12/2018 | Park et al. | |

FOREIGN PATENT DOCUMENTS

| | | | |
|---|---|---|---|
| CN | 204241855 | U | 4/2015 |
| CN | 104867406 | A | 8/2015 |
| CN | 105719571 | A | 6/2016 |
| CN | 106325056 | A | 1/2017 |
| CN | 206077461 | U | 4/2017 |
| CN | 206699578 | U | 12/2017 |
| CN | 207302507 | U | 5/2018 |
| CN | 108495031 | A | 9/2018 |
| CN | 108509124 | A | 9/2018 |
| CN | 109192070 | A | 1/2019 |
| CN | 109669340 | A | 4/2019 |
| GB | 2527612 | A | 12/2015 |
| JP | S59-137588 | U | 9/1984 |
| JP | 2010-288272 | A | 12/2010 |
| JP | 2016-58734 | A | 4/2016 |
| JP | 2017-516539 | A | 6/2017 |
| JP | 2017-532728 | A | 11/2017 |
| KR | 10-2016-0032563 | A | 3/2016 |
| KR | 10-2016-0094053 | A | 8/2016 |

* cited by examiner

SMART WATCH WITH FLEXIBLE DISPLAY PANEL

CROSS-REFERENCE TO RELATED APPLICATION

The present application is a 35 U.S.C. § 371 National Phase conversion of International Patent Application No. PCT/CN2020/074300, filed on Feb. 4, 2020, which is based on and claims the priority of Chinese patent application No. 201910111783.3, filed on Feb. 12, 2019. The entire disclosure of the above-identified application is incorporated herein by reference. The PCT International Patent Application was filed and published in English.

TECHNICAL FIELD

The present application relates to the field of wearable device, and in particular, to a smart watch.

BACKGROUND ART

In recent years, the form of electronic devices has gradually diversified to meet the different needs of the public. Among them, the wearable device is a technological product developed after the smart phone. Since the wearable device has the characteristics of being easy to wear and convenient for the user to use at any time, it is gradually popular among users, and its functions are more and more diverse. At this stage, there are different forms of wearable devices such as glasses, bracelets, watches, etc. Among them, smart watches are the most common wearable devices, providing users with a more revolutionary experience. In addition to the function of displaying time in general watches, smart watches also have functions such as recording sports data, detecting physical conditions, browsing photos, and sending and receiving emails. Therefore, smart watches have become more and more widely used in people's lives.

However, most wearable devices such as smart watches currently on the market have only a single screen of a small size, so the operation range is small, and the display function is limited. For example, only a small amount of information such as time and power can be displayed. The smart watch causes inconvenience when transmitting and receiving mail or browsing a webpage, and the like, which reduces the user experience of the smart watch product. As the function of smart watches becomes more and more complex, and a larger display panel is needed to provide effective human-computer interaction, the existing small-screen smart watches cannot meet the demand.

TECHNICAL SOLUTION

The object of the present application is to provide a smart watch to solve the problem that the existing smart watch has small screen size, limited display content, and poor user experience.

The embodiment of the present application provides a smart watch including a watch strap and a flexible display panel. The first end of the flexible display panel is attached to the watch strap, the second end of the flexible display panel is a free end. The flexible display panel has a bent state and a flattened state. When the flexible display panel is in the bent state, the flexible display panel and the watch strap are bent together and the flexible display panel is located on and in contact with an outer surface of the watch strap. When the flexible display panel is in the flattened state, the second end of the flexible display panel is out of contact with the outer surface of the watch strap and the flexible display panel is flattened in the same plane.

Further, the flexible display panel extends in the same direction as the watch strap.

Further, the flexible display panel is an OLED display.

Further, the first end of the flexible display panel is attached to one end of the watch strap.

Further, the watch strap is provided with a first engaging member, and the flexible display panel is provided with a second engaging member corresponding to the first engaging member. The second engaging member is provided at the second end of the flexible display panel. When the flexible display panel is in the bent state, the first engaging member and the second engaging member are engaged with each other.

Further, the first engaging member and the second engaging member are magnetic members. When the flexible display panel is in the bent state, the flexible display panel is attracted to the watch strap.

Further, the first engaging member and the second engaging member are locking members. When the flexible display panel is in the bent state, the flexible display panel is locked to the watch strap.

Further, the flexible display panel has an elasticity to return to the flattened state after bending. When the engagement between the flexible display panel and the watch strap is released, the flexible display panel is returned from the bent state to the flattened state under its own elasticity.

Further, the first end of the flexible display panel is detachably connected to the watch strap. Contacts used for transmitting signals and providing power are provided on the watch strap and the flexible display panel.

Further, one end of the watch strap is provided with a self-photographing camera, and the other end of the watch strap is provided with a main camera.

Further, the flexible display panel includes a first display area and a second display area. When the flexible display panel is in the bent state, only the first display area is turned on and the second display area is turned off. When the flexible display panel is in the flattened state, the first display area and the second display area are simultaneously used for full screen display.

Further, a controller is disposed within the watch strap, and the flexible display panel is electrically and signally connected to the controller.

Further, the smart watch further includes a sensor used for generating a control signal when the flexible display panel is in the bent state. The controller controls the second display area of the flexible display panel to be turned off according to the control signal.

Further, the sensor is a proximity sensor, a light sensor, or a pressure sensor.

Further, a third display area is further provided at a lateral side of the flexible display panel, and the third display area is pivotally connected to the lateral side of the flexible display panel. The third display area is able to be folded toward a back side of the first display area and the second display area. When the flexible display panel is in the bent state, the third display area is folded to the back side of the first display area and the second display area. When the flexible display panel is in the flattened state, the third display area is able to be unfolded so that the first display area, the second display area and the third display area are all located in the same plane.

Further, a recess is provided on a back surface of the flexible display panel, and the third display area is embedded in the recess after folding.

Further, a rechargeable battery is disposed within the watch strap, and the battery is bendable.

Further, a micro power generating device is disposed within the watch strap, and the micro power generation device is connected to the battery for charging the battery.

ADVANTAGEOUS EFFECTS

In the smart watch provided by the embodiments of the present application, only one end of the flexible display panel is connected with the watch strap, and the other end of the flexible display panel is a movable end, which allows the flexible display panel to have two states of bending and flattening. When the flexible display panel is in the bent state, the display of the smart watch becomes smaller and easy to wear; when the flexible display panel is in the flattened state, the display of the smart watch becomes larger and convenient for enjoying the operation of a large screen and greatly improving the user experience.

MODE FOR INVENTION

A smart watch in various embodiments of the present application will now be described with reference to the accompanying drawings. In the following description, the use of suffixes such as "module" or "unit" for indicating elements is merely for facilitating the description of the present application, and does not have a specific meaning per se. Therefore, "module" and "unit" can be used interchangeably.

Figure 1:
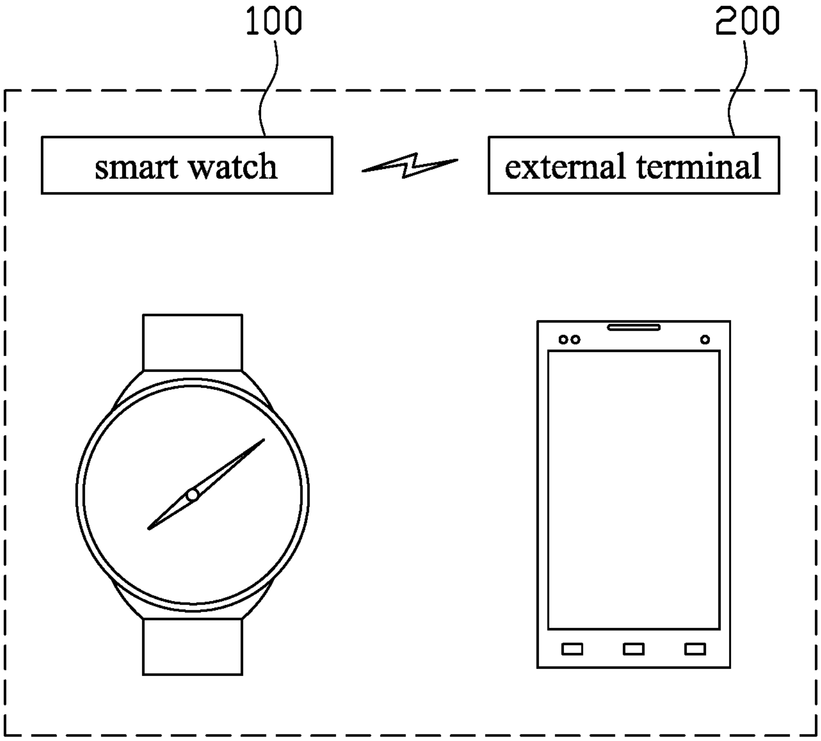
FIG. 1 is a schematic view of a wireless connection between a smart watch and an external terminal in various embodiments of the present application.

As shown in FIG. 1, the smart watch 100 can be configured to communicate with the external terminal 200 to transmit or receive data. The external terminal 200 can be implemented in various forms. For example, the external terminal 200 may include mobile terminals such as a mobile phone, a notebook computer, a PDA (Personal Digital Assistant), a PAD (Tablet), a PMP (Portable Multimedia Player), a navigation device, or the like, and immobile terminals such as a digital television, a desktop computer, or the like.

Figure 2:
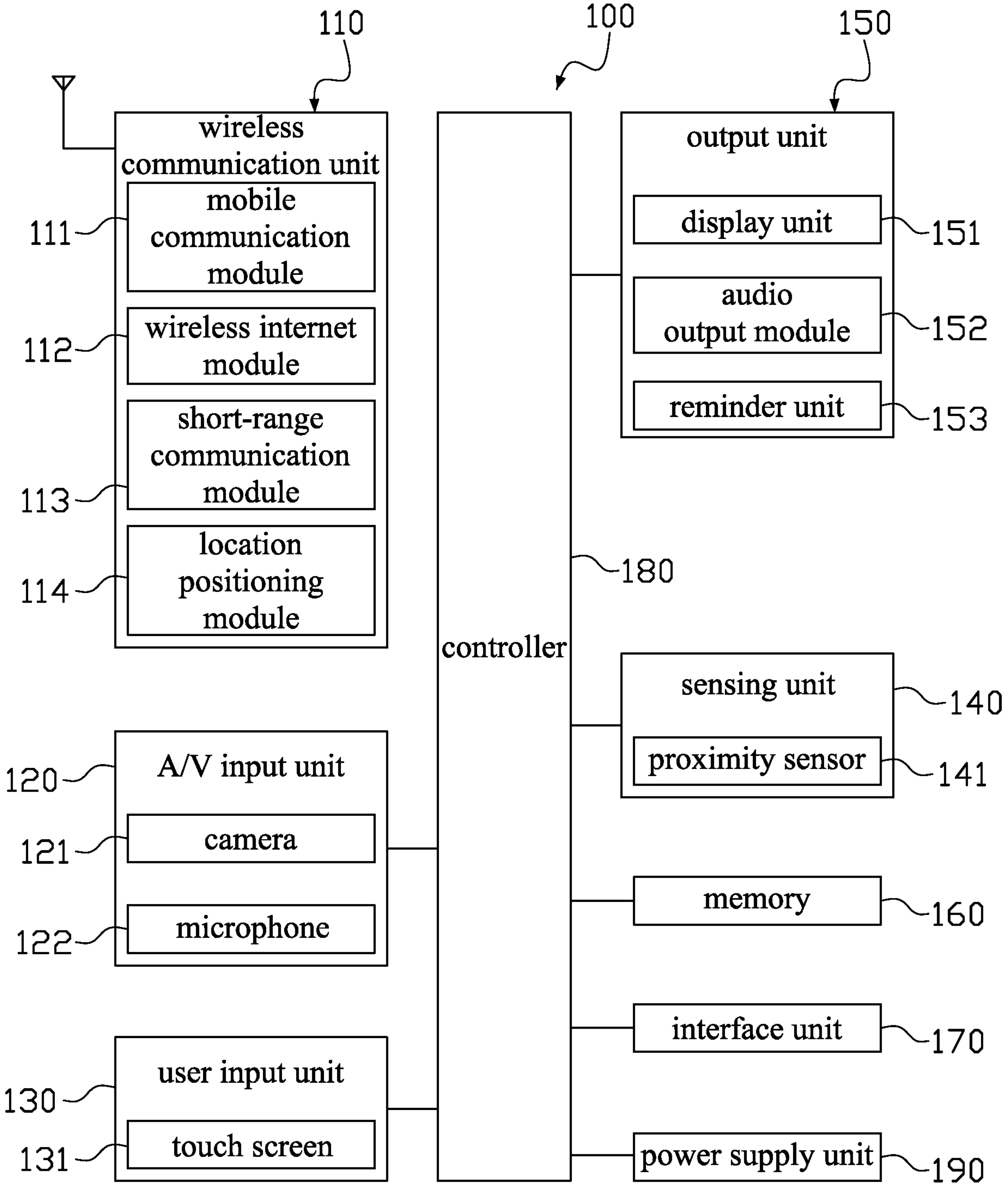
FIG. 2 is a schematic diagram showing the hardware structure of a smart watch in various embodiments of the present application.

As shown in FIG. 2, the smart watch 100 includes various components, such as, a wireless communication unit 110, an A/V (Audio/Video) input unit 120, a user input unit 130, a sensing unit 140, an output unit 150, a memory 160, an interface unit 170, a controller 180, and a power supply unit 190. The smart watch 100 having the various components is illustrated in FIG. 2, but it should be understood that not all the listed components are required and that more or fewer components may be implemented instead.

The wireless communication unit 110 typically includes one or more communication modules for communicating between the smart watch 100 and the external terminal 200 or a network. For example, the wireless communication unit 110 may include at least one of a mobile communication module 111, a wireless internet module 112, a short-range communication module 113, and a location positioning module 114.

The mobile communication module 111 is a module for transmitting a radio signal to and/or receiving a radio signal from at least one of a base station, an external terminal, and a server. Such radio signals may include voice call signals, video call signals, or various types of data transmitted and/or received in accordance with text and/or multimedia messages. Technical standards or communication methods for mobile communications may include Global System for Mobile Communications (GSM), Code Division Multiple Access (CDMA), CDMA2000 (Code Division Multiple Access 2000), Wideband CDMA (WCDMA), High Speed Downlink Packet Access (HSDPA), HSUPA (High Speed Uplink Packet Access), Long Term Evolution (LTE), LTE-A (Advanced Long Term Evolution), etc.

The wireless internet module 112 is a module for supporting wireless Internet access. Technologies suitable for wireless Internet access may include WLAN (Wireless LAN), Wireless Fidelity (Wi-Fi), Wibro (Wireless Broadband), Wimax (Worldwide Interoperability for Microwave Access), HSDPA (High Speed Downlink Packet Access), HSUPA (High Speed Uplink Packet Access), etc.

The short-range communication module 113 is a module for supporting short-range communication. Technologies suitable for short-range communications may include Bluetooth, Radio Frequency Identification (RFID), Infrared Data Association (IrDA), Ultra Wide Band (UWB), ZigBee, Near Field Communication (NFC), Wireless Fidelity (Wi-Fi), Wireless USB (Wireless Universal Serial Bus), etc.

The location positioning module 114 is a module for acquiring location information of the smart watch 100. A typical example of the location positioning module 114 is GPS (Global Positioning System).

The A/V input unit 120 is used for receiving an audio or video signal. The A/V input unit 120 may include a camera 121 and a microphone 122. The camera 121 is used for taking a picture or a video. The microphone 122 can receive sound in a phone call mode, a recording mode, and can process such sound as voice data.

The user input unit 130 allows the user to input various types of information, and may include a keyboard, a button, a touch screen 131, or the like. In particular, the touch screen 131 may be superimposed on the display unit 151.

The sensing unit 140 is generally configured to sense one or more of internal information of the smart watch 100, surrounding environment information of the smart watch 100, user information, or the like. The sensing unit 140 typically includes one or more sensors. For example, the sensing unit 140 shown in FIG. 2 includes a proximity sensor 141. The proximity sensor 141 can sense the presence or absence of an object approaching the surface, or an object located near the surface of the smart watch 100 by using a magnetic field, infrared rays or the like without mechanical contact. The sensing unit 140 may also include other types of sensors, such as acceleration sensors, magnetic sensors, gyro sensors, light sensors, operational sensors, and the like. The smart watch 100 can utilize information obtained from the sensing unit 140. For example, the controller 180 typically cooperates with the sensing unit 140 to control the operation of the smart watch 100 based on the sensing result provided by the sensing unit 140.

The output unit 150 is typically configured to output various types of information such as audio, video, and the like. The output unit 150 may include a display unit 151, an audio output module 152, a reminder unit 153, and the like. The display unit 151 may have an integrated structure including a touch sensor, that is, the touch screen 131 is integrally disposed in the display unit 151. The display unit 151 can display information processed in the smart watch 100. The display unit 151 may include at least one of a liquid crystal display (LCD), a thin film transistor LCD (TFT-LCD), an organic light emitting diode (OLED) display, and the like. The audio output module 152 is typically configured to output audio data. The audio output module 152 can include a speaker, a buzzer, and the like. The reminder unit 153 can provide an output to notify the occurrence of the event. Typical events may include call reception, message reception, and the like. The reminder unit 153 can provide an output in the form of vibration. Upon receiving a call or a message, the reminder unit 153 can provide a vibration to notify the user of it.

The memory 160 can store software programs, still images, videos and the like that are executed by the controller 180. The memory 160 may include a flash memory, a hard disk, a random access memory (RAM), a static random access memory (SRAM), a read only memory (ROM), an electrically erasable programmable read only memory (EEPROM), a programmable read only memory (PROM), a disk, etc.

The interface unit 170 serves as an interface with various types of external devices that can be connected to the smart watch 100. The interface unit 170 is capable of receiving data transmitted from an external device or transmitting internal data of the smart watch 100 to such external device. For example, the interface unit 170 may include a wired or wireless port, an external power port, a wired or wireless data port, a memory card port, a port for connecting a device having an identification module, an audio input/output (I/O) port, a video I/O port, an earphone port, etc. The identification module may be a chip that stores various information for verifying the authority to use the smart watch 100 and may include a User Identity Module (UIM), a Subscriber Identity Module (SIM), a Universal Subscriber Identity Module (USIM), and the like. Further, the device with the identification module can take the form of a smart card.

The controller 180 typically controls the overall operation of the smart watch 100. For example, the controller 180 processes signals, data, information and the like input or output by the various components described in FIG. 2, or activates an application stored in the memory 160.

The power supply unit 190 provides the required power for the various components in the smart watch 100. The power supply unit 190 can include a battery, and the battery can be configured to be rechargeable.

The various embodiments described herein can be implemented using, for example, computer software, hardware, or any combination thereof. For hardware implementation, it may be implemented by at least one of application specific integrated circuits (ASICs), digital signal processors (DSPs), digital signal processing units (DSPDs), programmable logic devices (PLDs), field programmable gate arrays (FPGAs), processors, controller, microcontroller, and microprocessor. For software implementation, it may be implemented with separate software modules that allow execution of at least one function or operation. The software code can be implemented by a software application written in any suitable programming language, which can be stored in the memory 160 and executed by the controller 180.

First Embodiment

Figure 3:
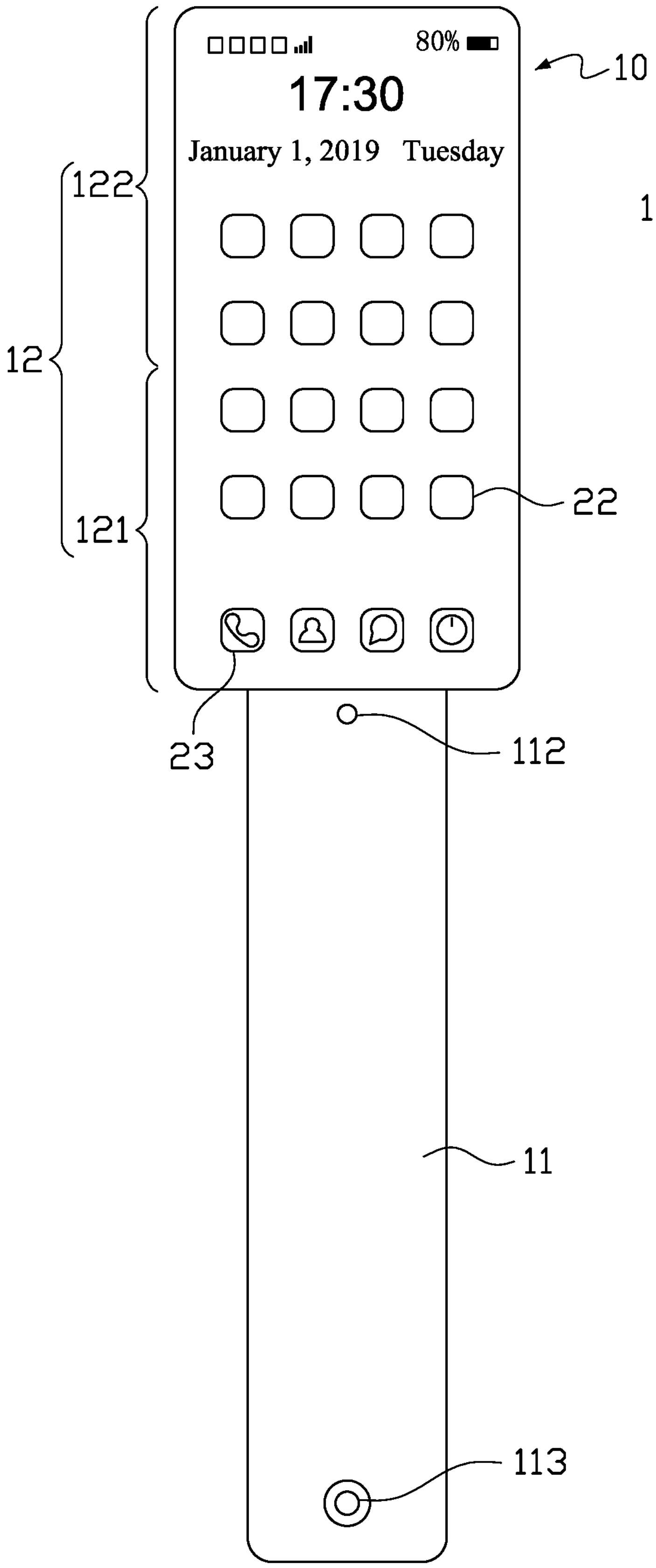
FIG. 3 is a front view of a smart watch according to a first embodiment of the present application.
Figure 4:
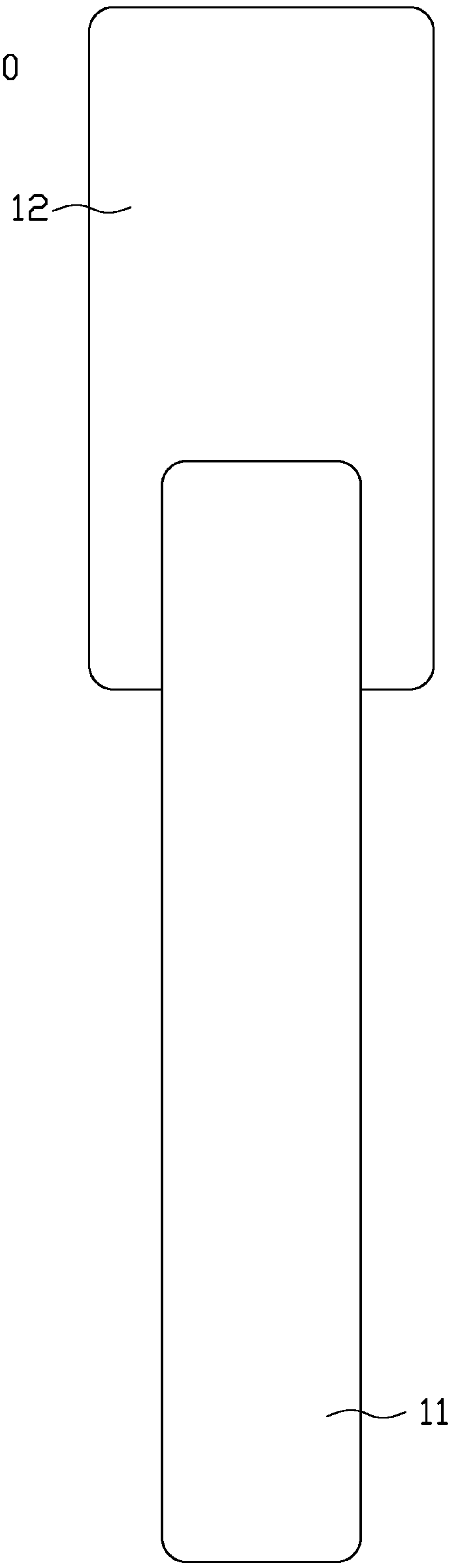
FIG. 4 is a rear view of the smart watch of FIG. 3.

FIG. 3 is a front view of a smart watch according to the first embodiment of the present application. FIG. 4 is a rear view of the smart watch of FIG. 3. Referring to FIG. 3 and FIG. 4, the first embodiment of the present application provides a smart watch 10 that can be configured to have the same or similar features as the smart watch 100 of FIG. 2.

The smart watch 10 includes a watch strap 11 and a flexible display panel 12. The flexible display panel 12 and the watch strap 11 extend in the same direction. One end (first end) of the flexible display panel 12 is attached to the watch strap 11, and the other end (second end) of the flexible display panel 12 is a free end. In particular, the first end of the flexible display panel 12 can be attached to one end of the watch strap 11.

The flexible display panel 12 has a bent state and a flattened state, and the flexible display panel 12 can be switched between the bent state and the flattened state according to actual needs, so as to improve the user experience.

Figure 6:
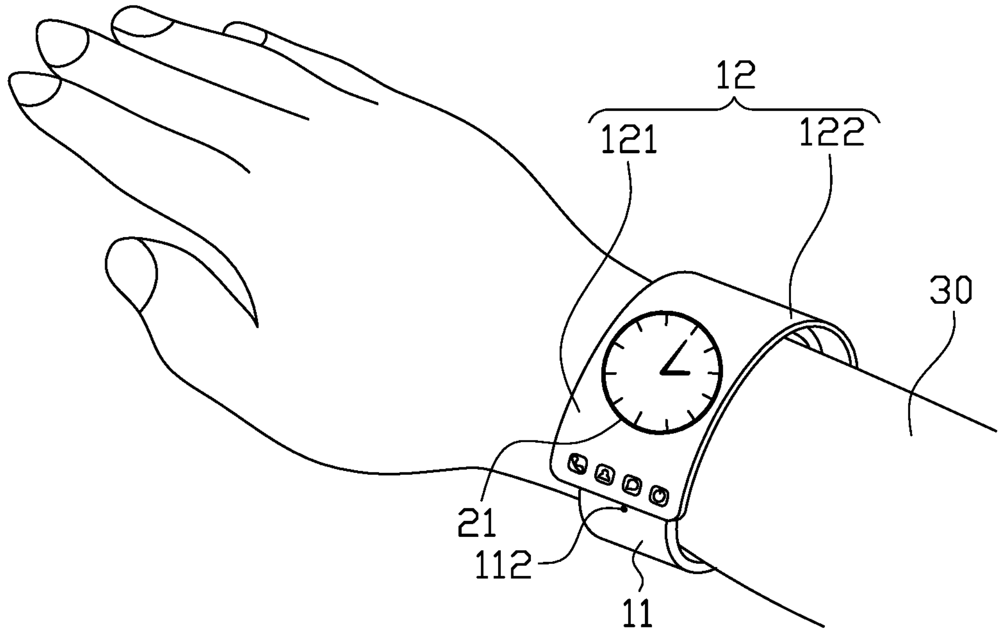
FIG. 6 is a schematic view showing the wearing of the smart watch of FIG. 3 when the flexible display panel is in a bent state.
Figure 7:
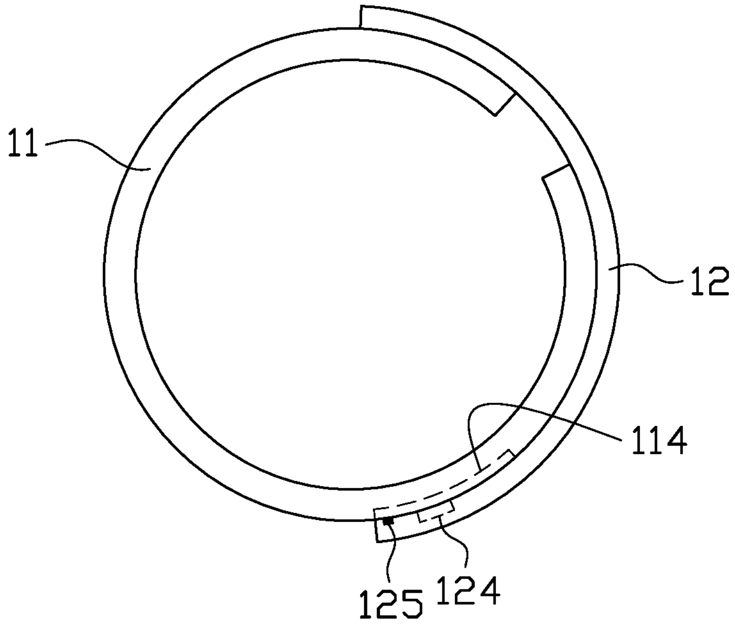
FIG. 7 is a cross-sectional view of the smart watch of FIG. 6 when the flexible display panel is in the bent state.

FIG. 6 is a schematic view showing the wearing of the smart watch of FIG. 3 when the flexible display panel is in the bent state, and FIG. 7 is a cross-sectional view of the smart watch of FIG. 6 when the flexible display panel is in the bent state. As shown in FIG. 6 and FIG. 7, in the bent state, the flexible display panel 12 is bent together with the watch strap 11 and worn on the wrist. The flexible display panel 12 is located on the outer surface of the watch strap 11, and the flexible display panel 12 is in contact with the outer surface of the watch strap 11.

Figure 8:
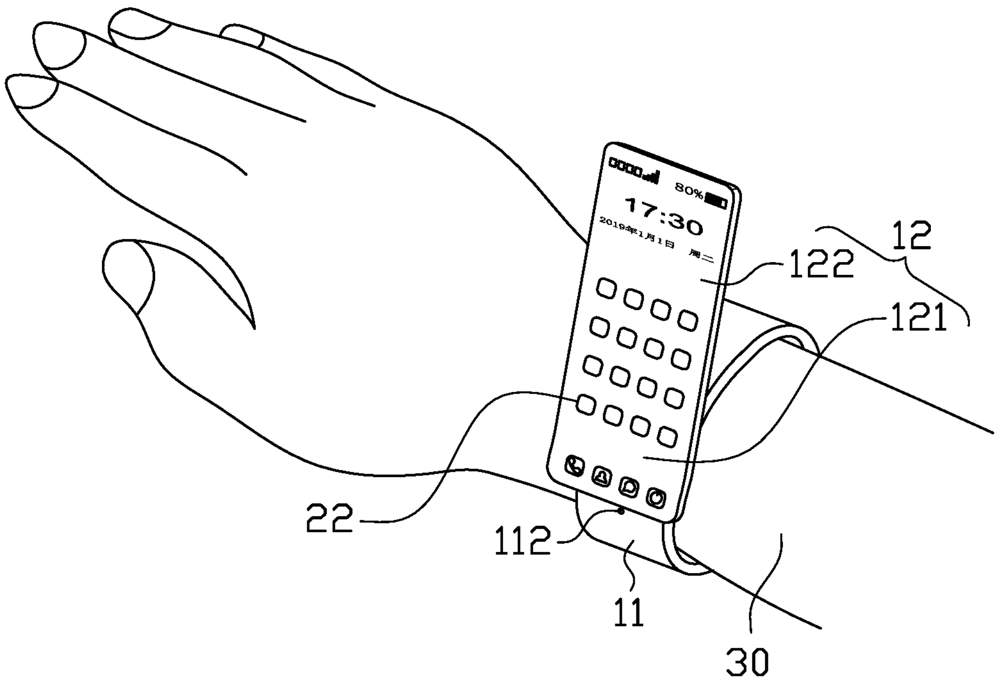
FIG. 8 is a schematic view showing the wearing of the smart watch of FIG. 3 when the flexible display panel is in a flattened state.
Figure 9:
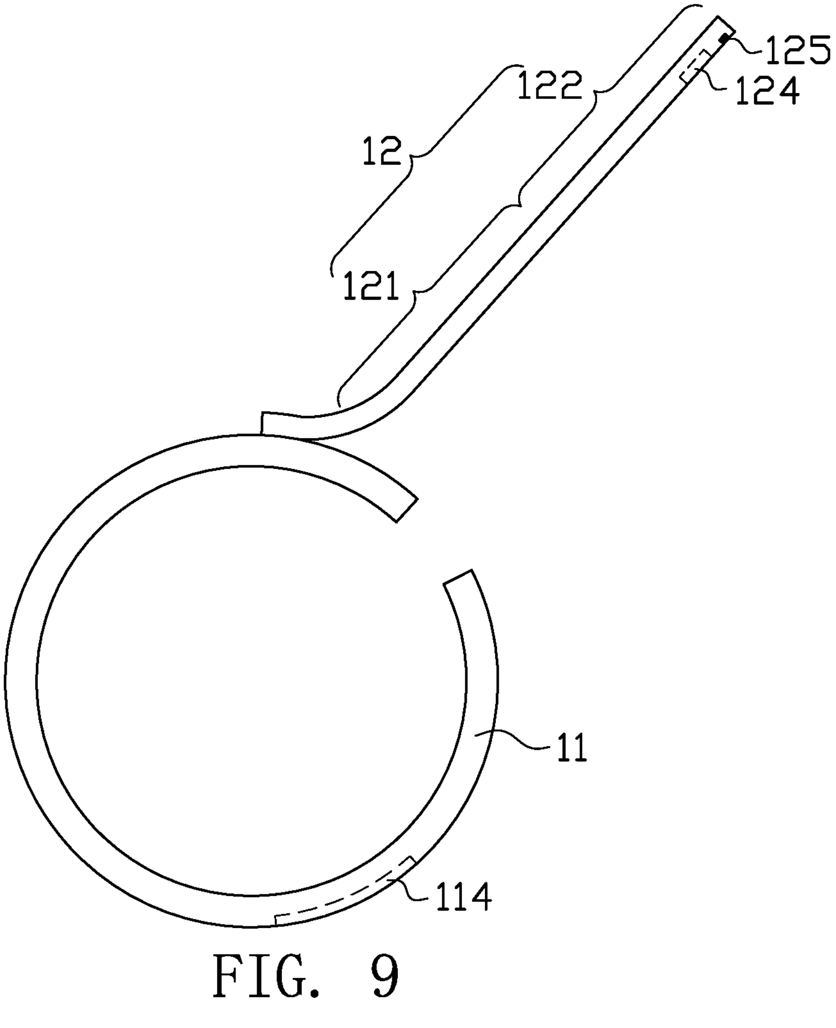
FIG. 9 is a cross-sectional view of the smart watch of FIG. 8 when the flexible display panel is in the flattened state.

FIG. 8 is a schematic view showing the wearing of the smart watch of FIG. 3 when the flexible display panel is in the flattened state, and FIG. 9 is a cross-sectional view of the smart watch of FIG. 8 when the flexible display panel is in the flattened state. As shown in FIG. 8 and FIG. 9, in the flattened state, the second end of the flexible display panel 12 is out of contact with the outer surface of the watch strap 11, and the flexible display panel 12 is flattened in the same plane. At this time, the flexible display panel 12 is connected to and supported on the watch strap 11 through the first end of the flexible display panel 12.

In this embodiment, the flexible display panel 12 is not wholly attached to the watch strap 11, but only one end of the flexible display panel 12 is attached to the watch strap 11, so as to electrically and signally connect to a circuit board (not shown) in the watch strap 11. The other end of the flexible display panel 12 is a moveable end. Therefore, the flexible display panel 12 is movable relative to the watch strap 11, so that the flexible display panel 12 can be bent and flattened. When the flexible display panel 12 is in the bent state, the display of the smart watch 10 becomes smaller, which is easy to wear; when the flexible display panel 12 is in the flattened state, the display of the smart watch 10 becomes larger, which is convenient for enjoying the operation experience of a large screen.

Specifically, the flexible display panel 12 may be an OLED (organic light-emitting diode) display panel, which may be made of a flexible material and thus can be folded or bent relatively easily.

The watch strap 11 is used to be worn on the user's wrist 30 and may be made of a flexible material to facilitate the wearing of the smart watch 10. The watch strap 11 can be specifically made of leather, rubber, silicone, synthetic resin, or the like. Moreover, a fixing structure may be provided at both ends of the watch strap 11, for example, a buckle is provided at one end of the watch strap 11, and a plurality of puncture holes corresponding to the buckle are provided at the other end of the watch strap 11. The engagement of the buckle in one of the puncture holes enables the watch strap 11 to be worn on the wrist 30. It can be understood that, in addition to the cooperation of the buckle and the puncturing hole, the watch strap 11 can also be worn on the wrist 30 by other means such as snapping, magnetic attraction, or the like.

In this embodiment, the watch strap 11 is a one-piece overall structure instead of the conventional two-piece watch strap. In the bent state, the first end of the flexible display panel 12 is attached to the watch strap 11, and the second end of the flexible display panel 12 can be engaged with the watch strap 11, for example, a first engaging member 114 is provided on the watch strap 11, a second engaging member 124 corresponding to the first engaging member 114 is provided on the flexible display panel 12. The second engaging member 124 is provided at the second end (i.e., the free end) of the flexible display panel 12. Through the first engaging member 114 and the second engaging member 124 to be engaged with each other, the flexible display panel 12 can be fixed to the watch strap 11 in the bent state. When the flexible display panel 12 needs to be flattened, the engagement between the flexible display panel 12 and the watch strap 11 can be released by applying a certain force to the second end of the flexible display panel 12.

In one example, the first engaging member 114 and the second engaging member 124 may be magnetic members to allow the flexible display panel 12 to be attracted to the watch strap 11 in the bent state. In other examples, the bent flexible display panel 12 can also be secured to the watch strap 11 in other manners, for example, a locking member is provided on each of the watch strap 11 and the flexible display panel 12, and the bent flexible display panel 12 is locked to the watch strap 11 through the locking members.

In one embodiment, the flexible display panel 12 may have an elasticity to return to the flattened state after bending. When the engagement between the flexible display panel 12 and the watch strap 11 is released, the flexible display panel 12 may be returned from the bent state to the flattened state under its own elasticity, so that the flexible display panel 12 is in the same planar plane.

Figure 5:
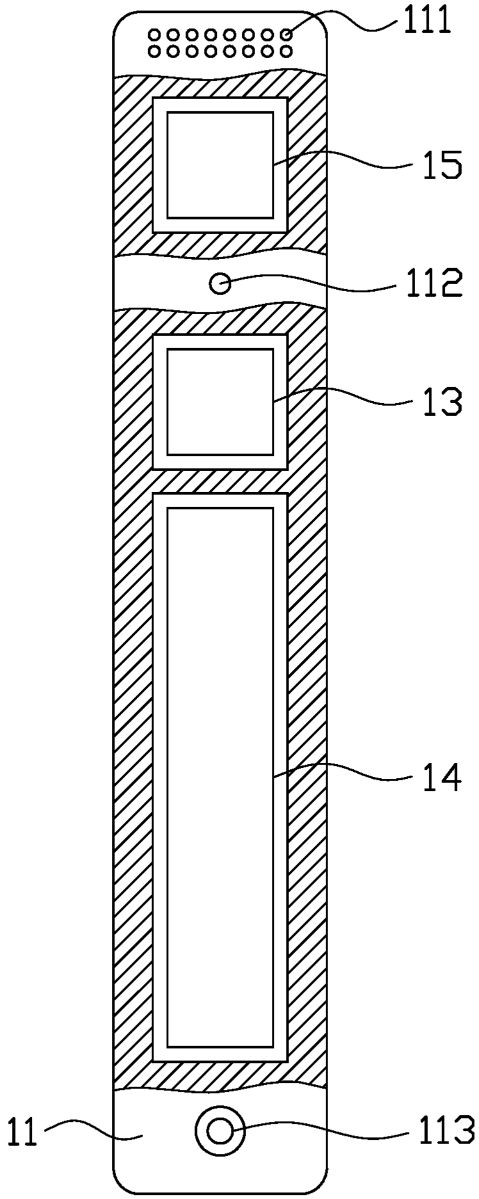
FIG. 5 is a schematic view of a watch strap of the smart watch of FIG. 3.

FIG. 5 is a schematic view of the watch strap of the smart watch of FIG. 3. Referring to FIG. 3 to FIG. 5, the first end of the flexible display panel 12 may be detachably connected to the watch strap 11, and contacts 111 used for transmitting signals and providing power are provided on the watch strap 11 and the flexible display panel 12. The flexible display panel 12 or the watch strap 11 can be replaced according to the actual needs of the user. If the smart watch 10 needs to be updated, only the flexible display panel 12 or the watch strap 11 needs to be replaced, which can reduce the user's cost. Moreover, the user can choose to wear different straps according to different usage scenarios (such as life and work), so that the use is more flexible and the user experience is improved.

Further, a self-photographing camera 112 is disposed on the watch strap 11 near one end of the watch strap 11 to which the flexible display panel 12 is connected, and a main camera 113 is disposed on the watch strap 11 near the other end of the watch strap 11 away from the flexible display panel 12, so that the smart watch 10 has the photographing function like a mobile phone.

The smart watch 10 may further include a controller 13 that may be disposed within the watch strap 11. The controller 13 is used to control the overall operation of the smart watch 10. The flexible display panel 12 is electrically and signally connected to the controller 13 disposed within the watch strap 11. Other components illustrated in FIG. 2, such as the memory or the like, may also be disposed within the watch strap 11. In a practical application scenario, the smart watch 10 can be used as a smart phone terminal, the memory can be used to store software programs, and the controller 13 can execute various functional applications and data processing by running a software program stored in the memory.

The flexible display panel 12 may include a first display area 121 and a second display area 122 along the extending direction of the watch strap 11. When the user wears the smart watch 10 and the flexible display panel 12 is bent, only the first display area 121 may be turned on to display information such as current time, weather, reminder messages, etc., and the second display area 122 is turned off to save power consumption. For example, a clock 21 is displayed in the first display area 121 as illustrated in FIG. 6. When a full-screen display is required, the flexible display panel 12 is flattened to the flattened state, thereby achieving the same function as a mobile phone, greatly improving the display area of the smart watch 10 and enhancing the user experience. For example, as illustrated in FIG. 8, the first display area 121 and the second display area 122 are displayed with a plurality of icons 22 for applications (APP). In addition, at the bottom end of the flexible display panel 12, there may be some functional buttons 23 for the smart watch 10, such as telephone dial button, etc.

Specifically, the smart watch 10 further includes a sensor 125 that can generate a control signal when the flexible display panel 12 is in the bent state, and the controller 13 controls the second display area 122 of the flexible display panel 12 to be turned off in response to the control signal, so as to reduce the power consumption of the smart watch 10. The sensor 125 can be provided on the watch strap 11 or on the flexible display panel 12. In this embodiment, the sensor 125 is disposed on the flexible display panel 12. The sensor 125 can be a proximity sensor. When the sensor 125 detects that the flexible display panel 12 is bent and approaches towards the watch strap 11, the control signal is generated to cause the controller 13 to control the second display area 122 to be turned off according to the control signal.

In order to generate the control signal to turn off the second display area 122, in addition to the proximity sensor, examples of the sensor 125 may also be light sensors, pressure sensors, and other sensors.

The first display area 121 and the second display area 122 may be separate, independent display areas, which are respectively controlled by two control circuits, or may be integrally formed by cutting a same display mother board and are controlled by the same control circuit.

The smart watch 10 may further include a rechargeable battery 14, which may be disposed within the watch strap 11, and the battery 14 may be bent to adapt with the shape of the watch strap 11. Specifically, the battery 14 may be a graphene battery having a flexible bendability and adapting to the curved shape of the watch strap 11.

The difference in inner and outer diameters due to the thickness of the battery during bending is a fundamental cause of difficulty in bending a polymer lithium ion battery. Studies have shown that, if the battery is made thin with only a few layers or even a single-layer structure and the elasticity of the film is strengthened, the difference between the inner and outer diameters when bending can be made very small, so that a battery that can be bent into a ring shape may be formed. In order to ensure the capacity of a very thin battery, a plurality of cells can be stacked, and the electrodes are taken out for parallel connection. The layers of the cells are not rigidly fixed, but can slide within a certain range, to absorb the difference in displacement between the layers when bending, so that the battery can have a large capacity and can be bent. Therefore, the battery 14 can also be a polymer lithium ion battery.

The smart watch 10 may further be provided with a micro power generating device 15 which may be disposed within the watch strap 11, and the micro power generating device 15 is connected to the battery 14 and can charge the battery 14 disposed within the watch strap 11. The micro power generation device 15 includes a movable magnet and a fixed stator coil for generating electric power when the watch is shaken, to provide electric power to the battery 14.

Specifically, in this embodiment, the micro power generating device 15 is a micro induction generator using the principle of magnetic line cutting. When the user wants to charge the smart watch 10, the smart watch 10 can be shaken back and forth. At this time, the magnet in the micro induction generator will shuttle back and forth within the stator coil. During the shuttling back and forth of the magnet, the magnet interacts with the stator coil to generate electrical energy, and the generated electrical energy can be charged into the battery 14 connected with the micro induction generator for storage. Based on this, when the user wears the smart watch 10 for normal walking or exercising, the smart watch 10 shakes and the magnet in the smart watch 10 is driven to cut magnetic lines of the stator coil to generate electric energy, and the generated electric energy is stored in the smart watch 10.

In the smart watch 10 of this embodiment, only one end of the flexible display panel 12 is connected to the watch strap 11, and the other end of the flexible display panel 12 is a movable end, so that the flexible display panel 12 has two states, i.e., the bent state and the flattened state. When the flexible display panel 12 is in the bent state, the display of the smart watch 10 becomes smaller, which is easy to wear; when the flexible display panel 12 is in the flattened state, the display of the smart watch 10 becomes larger, which is convenient for enjoying the operation of a large screen, thereby greatly improving the user experience.

Second Embodiment

Figure 10:
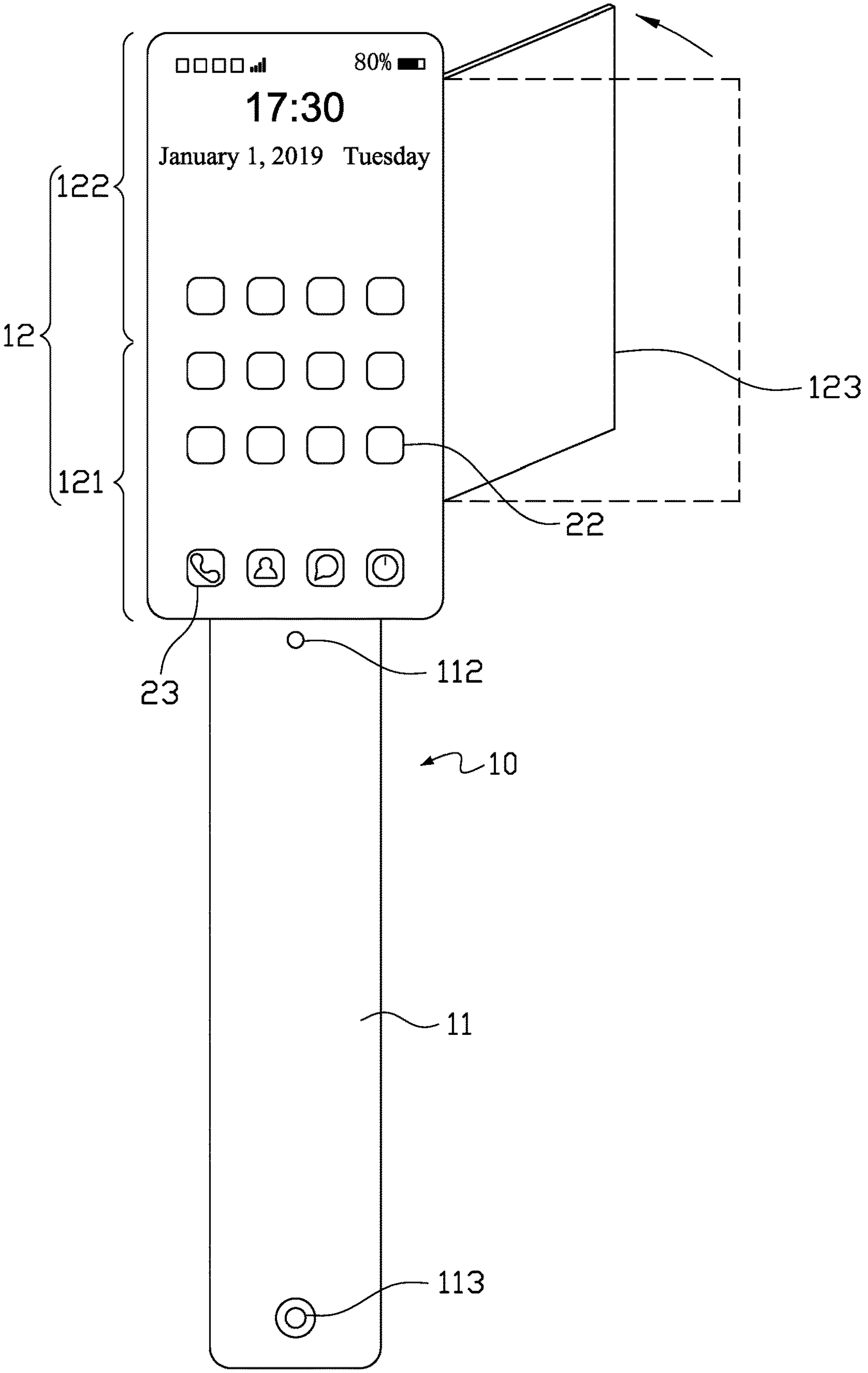
FIG. 10 is a front view of a smart watch according to a second embodiment of the present application.
Figure 11:
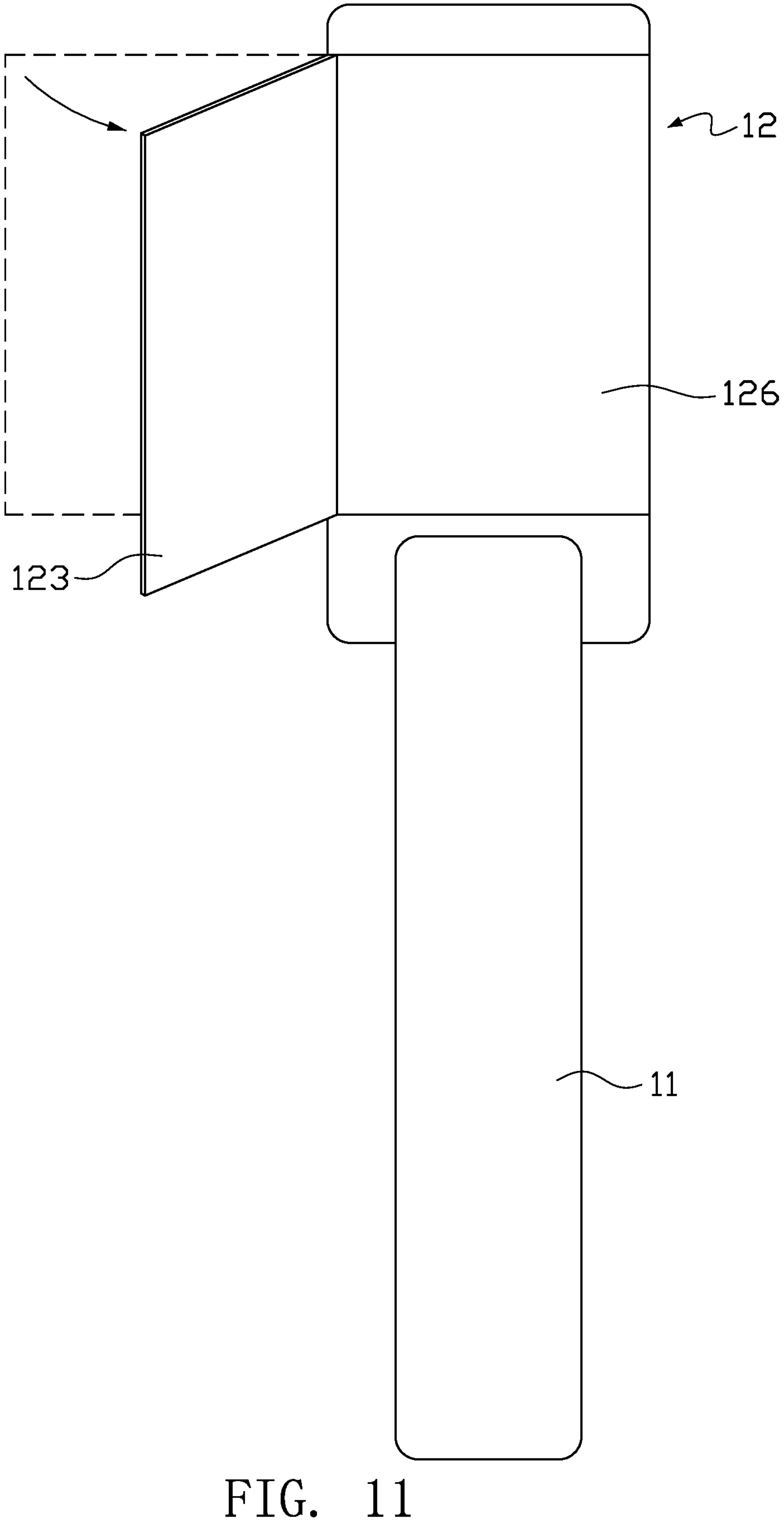
FIG. 11 is a rear view of the smart watch of FIG. 10.

FIG. 10 is a front view of a smart watch according to a second embodiment of the present application, and FIG. 11 is a rear view of the smart watch of FIG. 10. Referring to FIG. 10 and FIG. 11, the main difference between the second embodiment of the present application and the above first embodiment lies in that, in this embodiment, a third display area 123 is further provided at a lateral side of the flexible display panel 12. The third display area 123 is pivotally connected to the lateral side of the flexible display panel 12. The display area of the third display area 123 is substantially equal to the sum of the first display area 121 and the second display area 122, and the third display area 123 may be folded toward the back side of the first display area 121 and the second display area 122. A recess 126 may be provided on the back surface of the flexible display panel 12, and the third display area 123 may be embedded in the recess 126 after folding.

In this embodiment, when the flexible display panel 12 is in the bent state, the third display area 123 is folded to the back side of the first display area 121 and the second display area 122; when the flexible display panel 12 is in the flattened state, the third display area 123 can be unfolded, so that the first display area 121, the second display area 122 and the third display area 123 are all located in the same plane, which can increase the display area by nearly double, further improving the user experience.

For other structures of this embodiment, reference can be made to the above first embodiment, and details are not described herein again.

The present application has been described above by way of embodiments, but is not intended to limit the present application. For those skilled in the art, the technical solutions disclosed above may be modified without departing from the scope of the present application. Therefore, simple modifications or equivalent changes made to the above embodiments are still within the scope of the technical solutions of the present application.

What is claimed is:

1. A smart watch, comprising a watch strap and a flexible display panel, wherein the first end of the flexible display panel is attached to the watch strap, the second end of the flexible display panel is a free end, the flexible display panel has a bent state and a flattened state, when the flexible display panel is in the bent state, the flexible display panel and the watch strap are bent together and the flexible display panel is located on and in contact with an outer surface of the watch strap, when the flexible display panel is in the flattened state, the second end of the flexible display panel is out of contact with the outer surface of the watch strap and the flexible display panel is flattened in the same plane;

wherein the watch strap has two ends which are separated from each other, with a notch formed between the two ends of the watch strap, the watch strap is provided with a first engaging member, the flexible display panel is provided with a second engaging member corresponding to the first engaging member, the second engaging member is provided at the second end of the flexible display panel; when the flexible display panel is in the bent state, the flexible display panel spans the notch, and the first engaging member and the second engaging member are engaged with each other.

2. The smart watch of claim 1, wherein the flexible display panel extends in the same direction as the watch strap.

3. The smart watch of claim 1, wherein the flexible display panel is an OLED display.

4. The smart watch of claim 1, wherein the first end of the flexible display panel is attached to one end of the watch strap adjacent to the notch, the first engaging member is provided on the other end of the watch strap adjacent to the notch.

5. The smart watch of claim 1, wherein the first engaging member and the second engaging member are magnetic members, when the flexible display panel is in the bent state, the flexible display panel is attracted to the watch strap.

6. The smart watch of claim 1, wherein the first engaging member and the second engaging member are locking members, when the flexible display panel is in the bent state, the flexible display panel is locked to the watch strap.

7. The smart watch of claim 1, wherein the flexible display panel has an elasticity to return to the flattened state after bending, when the engagement between the flexible display panel and the watch strap is released, the flexible display panel is automatically returned from the bent state to the flattened state under its own elasticity.

8. The smart watch of claim 7, wherein the first end of the flexible display panel is fixedly and immovably attached to the watch strap, when the flexible display panel is switched from the flattened state to the bent state, the flexible display panel is caused to be deformed and curved towards the watch strap until the first engaging member and the second engaging member are engaged with each other.

9. The smart watch of claim 1, wherein the first end of the flexible display panel is detachably connected to the watch strap, contacts used for transmitting signals and providing power are provided on the watch strap and the flexible display panel.

10. The smart watch of claim 1, wherein one end of the watch strap is provided with a self-photographing camera, and the other end of the watch strap is provided with a main camera.

11. The smart watch of claim 1, wherein the flexible display panel comprises a first display area and a second display area, when the flexible display panel is in the bent state, only the first display area is turned on and the second display area is turned off, when the flexible display panel is in the flattened state, the first display area and the second display area are simultaneously used for full screen display, wherein the first display area and the second display area are two different areas of a single flexible display panel.

12. The smart watch of claim 11, wherein a controller is disposed within the watch strap, and the flexible display panel is electrically and signally connected to the controller.

13. The smart watch of claim 12, wherein the smart watch further comprises a sensor used for generating a control signal when the flexible display panel is in the bent state, the controller controls the second display area of the flexible display panel to be turned off according to the control signal.

14. The smart watch of claim 13, wherein the sensor is a proximity sensor, a light sensor, or a pressure sensor.

15. The smart watch of claim 11, wherein a third display area is further provided at a lateral side of the flexible display panel, and the third display area is pivotally connected to the lateral side of the flexible display panel, the third display area is able to be folded toward a back side of the first display area and the second display area, when the flexible display panel is in the bent state, the third display area is folded to the back side of the first display area and the second display area, when the flexible display panel is in the flattened state, the third display area is able to be unfolded so that the first display area, the second display area and the third display area are all located in the same plane.

16. The smart watch of claim 15, wherein a recess is provided on a back surface of the flexible display panel, and the third display area is embedded in the recess after folding.

17. The smart watch of claim 11, wherein when the flexible display panel is in the bent state, the flexible display panel is stacked on the watch strap, with both the first display area and the second display area of the flexible display panel being exposed on the watch strap.

18. The smart watch of claim 1, wherein a rechargeable battery is disposed within the watch strap, and the battery is bendable.

19. The smart watch of claim 18, wherein a micro power generating device is disposed within the watch strap, and the micro power generation device is connected to the battery for charging the battery.

* * * * *